Patented Apr. 30, 1940

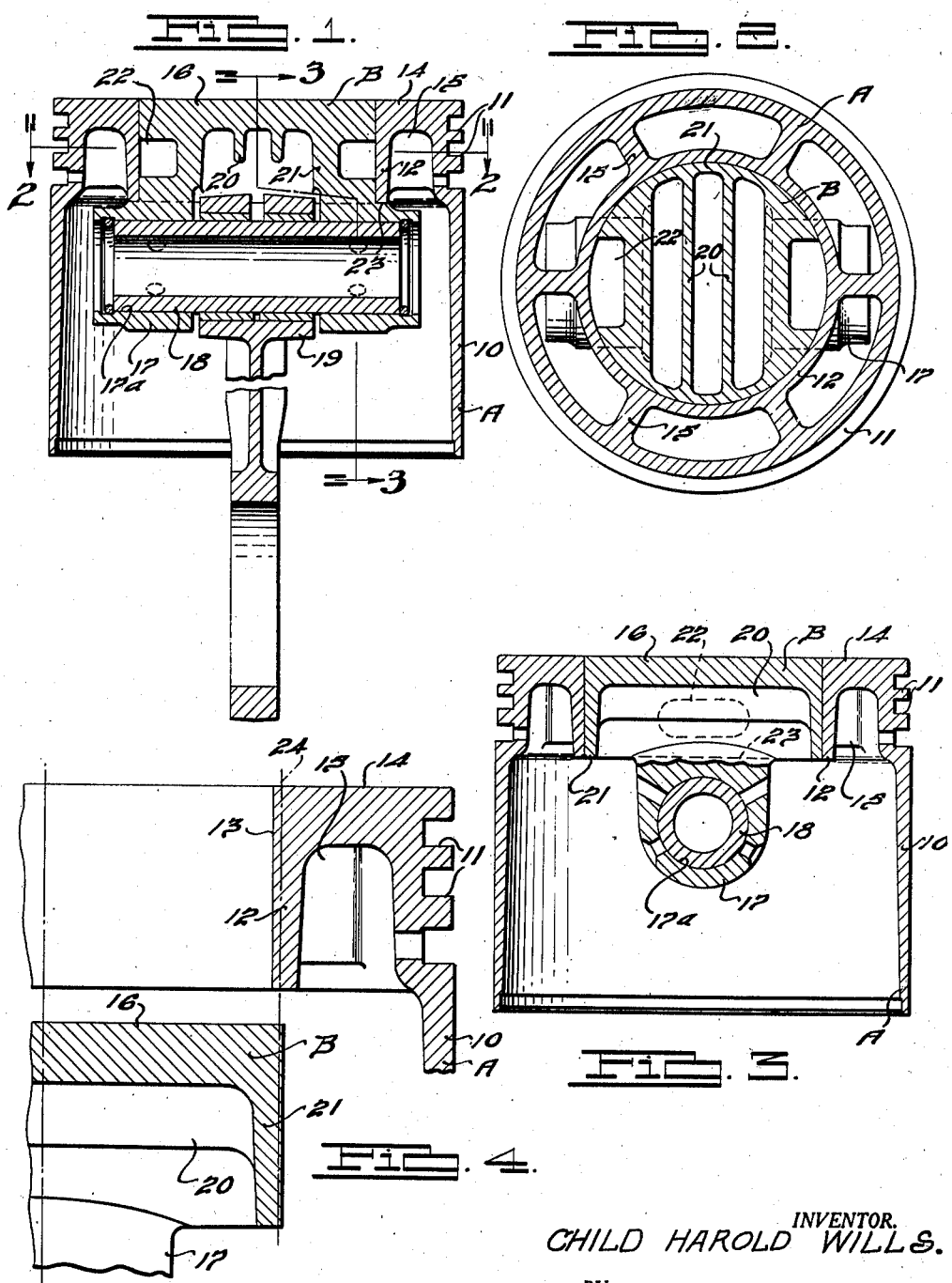

2,198,689

UNITED STATES PATENT OFFICE 2,198,689

PISTON AND METHOD OF MAKING THE SAME

Child Harold Wills, Grosse Pointe Farms, Mich., assignor to Chrysler Corporation, Highland Park, Mich., a corporation of Delaware Application January 30, 1937, Serial No. 123,117

2 Claims. (Cl. 309—9)

This invention relates to pistons for use in internal combustion engines.

One object of my invention is to provide an improved piston of relatively light weight capable of manufacture at relatively low cost.

A further object is to provide a piston construction providing improved thermal characteristics in its operation, affording improved conditions of "hot" and "cold" running in the engine cylinder, improved gas sealing, and improved wearing characteristics with a minimum of friction losses.

Another object is to provide a composite piston having its parts held together in assembled condition in an improved manner, preferably without the use of screws, bolts or other fasteners which are objectionable for many recognized reasons.

An additional object is to provide a piston assembly comprising a solid cylindrical skirt portion adapted to carry one or more sealing rings, the head portion being provided with the piston pin boss or bosses disposed within the skirt portion and free from connection therewith. Such an arrangement provides for uniform heat and stress conditions in the piston skirt resulting, among other things, in providing a low unit pressure engagement with the cylinder and a desirable stability in the thermal conditions of the piston.

A further object is to provide an improved method of making and assemblying a piston, especially of the type referred to above.

Further objects and advantages of my invention will be more apparent from the following illustrative embodiment of the principles of my invention, reference being had to the accompanying drawing, in which:

Fig. 1 is a sectional elevational view of the piston, showing a connecting rod articulated thereto.

Fig. 2 is a sectional plan view along the line 2—2 of Fig. 1.

Fig. 3 is a sectional elevational view along the line 3—3 of Fig. 1.

Fig. 4 is an enlarged fragmentary sectional view of engageable parts of the piston skirt and head as seen in Fig. 3 prior to assembly of these parts.

Referring to the drawing, reference character A represents the skirt portion of my piston and B the head portion, these parts being preferably separately cast of a light weight alloy such as commercial Duralumin.

The skirt A has a solid cylindrical main body 10 preferably free from slots, holes and the like, whereby uniform heat and stress conditions will be obtained without localized high unit pressure points when operating in the usual cylinder (not shown). At the upper end of the cylindrical body 10, the skirt A is provided with one or more piston ring-receiving grooves 11 to seal the piston against gas and oil leakage. Adjacent this grooved end, the skirt is formed with an inwardly extending annular flange 12 providing a cylindrical opening 13 coaxial with the piston axis for receiving the head B as will be presently apparent. The outer grooved end of the skirt and flange 12, in the present embodiment, are connected by the annular marginal portion 14 of the working face of the piston, together with strengthening ribs 15.

The head B comprises a unitary casting having a main annular head portion 16 formed with the inwardly extending bosses 17 provided with aligned openings 17a adapted to accommodate a piston pin 18 for articulation to a connecting rod 19. The underface of the head portion 16 is ribbed at 20 transversely to the axis of openings 17a. An annular cylindrical portion 21 joins head portion 16 with bosses 17, this cylindrical portion being provided with spaces 22 to lighten the weight of the piston assembly.

The bosses 17 depend within the skirt body 10 in spaced relationship therewith. In order to limit the assembly of the head and skirt portions, as will be presently more apparent, bosses 17 are provided with seats 23 engaged by the inner end of flange 12.

Prior to assembly of the piston head and skirt, referring particularly to Fig. 4, the diameter of opening 13 is less than the diameter after assembly and the diameter of cylindrical portion 21 is greater than after assembly.

For assemblying the parts, I subject the head B to a shrinking process and the skirt A to an expanding process, under which conditions the parts may be assembled preferably by the application of a hand light pushing force. Head B is contracted by subjecting it to commercial "dry ice" and skirt A is expanded by subjecting it to a hot liquid such as oil. In Fig. 4 the overlap of the engageable surfaces has been exaggerated for purposes of illustration, the surface contact upon assembly being indicated at 24.

As an illustration for a piston of approximately the size illustrated in my drawing, the diametrical difference or overlap between opening 13 and portion 21 may be approximately .008 of an inch so that after the aforesaid hot and cold treatments this diametrical difference will afford a clearance of approximately .001 of an inch. At least this amount of clearance is desirable at the start of assembly as the heat interchange is rapid and a lesser amount of clearance requires an unduly rapid assembly operation with more pushing force than is otherwise necessary.

In order to produce the desired clearance from the initial diametrical overlap, the head B is "frozen" to approximately −40° F. while skirt A is heated to approximately 450° F., it being understood that specific values given herein are by way of illustration only, as they may be varied according to final requirements of desired fits and for other reasons.

In view of the relatively greater temperature increase of skirt A above normal room temperature compared with the temperature decrease of head B, the diameter of opening 13 will be increased more than the decrease of portion 21, such condition being illustrated in Fig. 4 in reference to the assembly engagement at 24.

On assembly of the parts, the head portion 21 expands due to the rise in temperature and the flange 12 will contract diametrically inwardly of opening 13 whereby portion 21 will act in compression against flange 12, the latter acting in tension against portion 21 to securely hold these parts together under all conditions met with during the operation of the piston in the engine. During operation of the piston, the tight fit of the parts when the engine is "cold" as before starting, will be maintained and actually increased, it being recognized that the central parts of a piston face are hotter than the marginal parts. This will cause the head portion 16 to expand to a greater extent than that of flange 12.

Various modifications and changes will be apparent from the teachings of my invention, as defined in the appended claims, and it is not my intention to limit my invention to the particular details of construction and method shown and described for illustrative purposes.

I claim:

1. In a piston, a substantially cylindrical skirt portion and a grooved sealing ring receiving end portion integral therewith, said end portion including an annular radially inwardly extending marginal portion having an axially extending opening therethrough, a piston head fitting in said opening and having piston pin receiving means depending therefrom and in spaced relation to the wall of said skirt, said marginal portion and said head having end face portions cooperating to present a piston end face, said marginal portion including a depending integral annular flange spaced radially from the adjacent portion of said grooved portion and engaging said piston head, and circumferentially spaced radially extending ribs connecting said depending flange and said ring receiving end portion.

2. In a piston, a substantially cylindrical skirt portion and a grooved sealing ring receiving end portion integral therewith, said end portion including an annular radially inwardly extending marginal portion having an axially extending opening therethrough, and a piston head fitting in said opening and having piston pin receiving means depending therefrom and in spaced relation to the wall of said skirt, said marginal portion and said head having face portions cooperating to present a piston end face, said marginal portion including a depending integral annular flange spaced radially from the adjacent portion of said grooved portion and engaging said piston head, said piston head having circumferentially spaced openings in the axial periphery thereof and disposed in substantial axial alignment with said piston pin receiving means.

CHILD HAROLD WILLS.